(12) United States Patent
Kwak et al.

(10) Patent No.: US 6,551,536 B1
(45) Date of Patent: Apr. 22, 2003

(54) REVERSE OSMOSIS MEMBRANE HAVING EXCELLENT ANTI-FOULING PROPERTY AND METHOD FOR MANUFACTURING THE SAME

(75) Inventors: Seung-Yeop Kwak, Seoul (KR); Sung-Ho Kim, Daejun-si (KR); Soon-Sik Kim, Seoul (KR)

(73) Assignee: Saehan Industries Incorporation, Kyongsangbuk-do (KR)

( * ) Notice: Subject to any disclaimer, the term of this patent is extended or adjusted under 35 U.S.C. 154(b) by 0 days.

(21) Appl. No.: 09/920,308

(22) Filed: Aug. 2, 2001

(51) Int. Cl.⁷ .......................... B29D 65/00; B01D 71/56
(52) U.S. Cl. .................. 264/45.1; 264/41; 210/490; 210/500.38; 210/500.25; 210/500.26; 210/55; 210/523; 210/524
(58) Field of Search ................. 210/500.25, 500.26, 210/490, 500.38; 55/523, 524; 264/41, 45.1

(56) References Cited

U.S. PATENT DOCUMENTS 4,473,476 A * 9/1984 McMillan et al.
4,935,139 A * 6/1990 Davidson et al.
5,006,248 A * 4/1991 Anderson et al.
5,232,598 A * 8/1993 Thomas et al.
5,342,431 A * 8/1994 Anderson et al.
5,364,586 A * 11/1994 Thrusov et al.
6,077,800 A * 6/2000 Takahashi et al.

* cited by examiner

Primary Examiner—Ana Fortuna
(74) Attorney, Agent, or Firm—Harrison & Egbert

(57) ABSTRACT

A reverse osmosis membrane having excellent antifouling property, which is advantageous in terms of fundamental prevention of fouling generated by inorganic crystalloids, organic contaminants, and microorganisms, and a method for preparing the same. The membrane can be manufactured by hydrolyzing a titanium compound in an acidic aqueous solution to produce $TiO_2$ particles of nano scale; dispersing the produced $TiO_2$ particles in an acidic aqueous solution of pH 1–6 or an alkaline aqueous solution of pH 9–13 to yield a stable $TiO_2$ dispersed solution; and immersing a reverse osmosis membrane prepared by a known method in the $TiO_2$ dispersed solution to incorporate $TiO_2$ into the membrane.

7 Claims, No Drawings

REVERSE OSMOSIS MEMBRANE HAVING EXCELLENT ANTI-FOULING PROPERTY AND METHOD FOR MANUFACTURING THE SAME

BACKGROUND OF THE INVENTION

1. Field of the invention

The present invention relates to a reverse osmosis membrane having excellent anti-fouling property, and, more specifically, to a nano structure type reverse osmosis membrane, in which $TiO_2$, a representative photocatalyst having not only decomposition activity against various organic contaminants, but also antimicrobial activity against microorganisms, is incorporated to the membrane surface, and a method for preparing the same.

2. Description of the Related Art

In general, a reverse osmosis membrane has been applied to various fields, such as desalination of sea water, wastewater treatment, production of ultra pure water, treatment of purified water for households, and the like. With a view of increasing water permeability of the membrane or improving removal of salt, research for such reverse osmosis has been carried out. In this regard, U.S. Pat. No. 4,872,984 to Tomashke and U.S. Pat. No. 4,983,291 to Chau disclose a novel polyamide reverse osmosis membrane, capable of increasing water permeability and improving the removal of salt.

Meanwhile, water treatment processes using the reverse osmosis membrane suffer from fouling. Fouling is the deposition of material, referred to as foulant, on the membrane surface or in its pores, leading to a change in membrane behavior or even complete plugging of the membrane. These phenomena manifest themselves over time by increased operating pressure whereby water permeability properties, such as water permeability or removal of salt, are decreased. Hence, most of operation cost of water treatment facilities is used to repair damage caused by such fouling and in prevention of the fouling. There is thus a widely recognized need for fundamental preventive measures.

Examples of the foulant classified by form include inorganic crystalloids, organic contaminants, particulate matters and colloids, and microorganisms. In the case of the polyamide reverse osmosis membrane, the fouling attributed to microorganisms, in which microorganisms present in water are absorbed into the surface of the membrane and thus a thin bio-film is formed, is known to be the most serious one.

In order to decrease the fouling, pretreatment of water, modification of electrical properties of the membrane surface, modification of module process condition, and periodical cleaning are widely utilized. In particular, it is reported that the fouling by microorganisms, which is seriously generated in the reverse osmosis membrane, is drastically decreased by treatment with sterilizing agents, such as chlorine. However, chlorine creates carcinogenic by-products. So, when chlorine is applied as is to the process of producing potable water, it is known to cause many problems. Recently, research to produce membranes with antifouling properties is focused on change of electrical charge characteristics of the membrane surface. But, the fact is that a novel membrane, capable of drastically decreasing the fouling, is not developed yet.

Meanwhile, $TiO_2$ which is a highly effective photocatalyst, kills microorganisms under ultraviolet or solar radiation and decomposes organic contaminants. By use of such antimicrobial properties, many cases applied to packaging films, storing boxes, wall paper, seats, interior materials of automobiles, lamps, eye shields, air conditioners, electronic ranges, bottom materials, refrigerators and so on, are described in patents and papers.

In addition, techniques for decomposing organic contaminants and killing microorganisms by directly dispersing $TiO_2$ powder into water, in water treatment process, are known. Conventional water treatment processes using $TiO_2$ can decompose organic contaminants and kill microorganisms present in water, without harmful by-products, so that much research into applicability for water treatment processes has been continuously performed. However, the water treatment process for photodecomposition by adding $TiO_2$ particles to water suffers from the disadvantages of requiring a secondary process for recovering $TiO_2$ particles and difficultly in recycling the particles. Therefore, such process cannot be completely applied for water treatment.

BRIEF SUMMARY OF THE INVENTION

Therefore, it is an object of the present invention to overcome the above problems encountered in the prior arts and to provide a novel reverse osmosis membrane having excellent antifouling property, by incorporating $TiO_2$ particles of nano scale with photocatalytic properties to the membrane in a fixed form in order to fundamentally prevent fouling generated during the membrane use.

It is another object of the present invention to provide a method for manufacturing the reverse osmosis membrane having excellent antifouling property.

DETAILED DESCRIPTION OF THE INVENTION

In the present invention, $TiO_2$ particles of nano scale are obtained by adding a titanium compound, such as $Ti[OCH(CH_3)_2]_4$, $TiCl_4$, $TiOSO_4$, or $TiOCl_2$, to an acidic aqueous solution, to perform hydrolysis. As such, use of aqueous solution of strong acid with a pH range of 0.5–3 results in favorable generation of nano particles. Soon after, a pH range of thusly obtained aqueous titanic acid solution is regulated to 1–6 or 9–13, thereby yielding a stable $TiO_2$ dispersed solution. However, it is more preferable that, because of concern about adulteration caused by impurities in said condition, $TiO_2$ particles are separated from the aqueous titanic acid solution obtained by hydrolyzing the titanium compound, and dried, to yield $TiO_2$ as a white powder, which is then dispersed into an acidic solution of pH 1–6 or an alkaline aqueous solution of pH 9–13, thereby obtaining a stable $TiO_2$ dispersed solution. In the case of using the aqueous solution less than 1 or exceeding 13 in pH, the membrane may be degraded by strong acid or strong alkali. On the other hand, if the pH of the aqueous solution exceeds 6 and is less than 9, $TiO_2$ particles of nano scale are aggregated and thus precipitated. Hence, stability of dispersed solution becomes poor.

The methods for separating $TiO_2$ particles from aqueous titanic acid solution and for drying the $TiO_2$ particles are not limited in the present invention, and all separation and drying methods can be utilized. In this regard, the aqueous solution can be directly evaporated and thus dried.

Meanwhile, upon production of $TiO_2$ through hydrolysis of titanium compound, various metal oxides are added in the amount of 0.1–1.0 wt % to the aqueous solution, thereby obtaining $TiO_2$ particles of nano scale doped with the metal ions. When such particles are used for preparation of stable $TiO_2$ dispersed solution, $TiO_2$ photocatalytic effect can be increased. As such, the usable metal oxides comprise LiOH, $Mg(ClO_4)_2$, $AlCl_3$, $VCl_3$, $VOSO_4 \cdot 3H_2O$, $VOCl_3$, $Cr(NO_3)_3$, $MnF_3$, $F_2(NO_3)_3 \cdot 9H_2O$, $CoF_3$, $NiCl_2$, $Zn(ClO_4)_2$, $Ga(NO_3)_3$, $Zr[OCH(CH_3)_2]_4$, $NbCl_5$, $MoCl_3$, $RUCl_3$, $Rh(NO_3)_3 \cdot 2H_2O$, $SnCl_4$, $SbCl_3$, $TaCl_5$, $ReCl_5$, $OsCl_3$, $SbCl_5$ and so on. Such metal oxide is preferably added in the amount of about 0.1–1.0 wt %, based on the weight of the aqueous solution.

In the present invention, the reverse osmosis membrane incorporated with $TiO_2$ particles of nano scale is prepared by immersing the reverse osmosis membrane into stable $TiO_2$ dispersed solution. The immersing period of time varies with pH of the solution, but is not specifically limited, as long as $TiO_2$ particles are sufficiently incorporated to the membrane. The mechanism of incorporation of $TiO_2$ into the membrane is believed to be such that $TiO_2$ is self-assembled to functional groups present on the surface of the membrane by coordination bonds and thus fixed. In addition, as the reverse osmosis membrane of the present invention, use can be made of all kinds of membranes including a polyamide type reverse osmosis membrane.

In the present invention, $TiO_2$ having excellent photocatalytic effect is used and thus the reverse osmosis membrane with superior anti-fouling property is disclosed. Additionally, by using various photocatalytic inorganic oxides, such as CdS, $WO_3$, $SrTiO_3$, $MoSe_2$, and GaAs, which are known to show photocatalytic effect similar to $TiO_2$, the reverse osmosis membrane with excellent anti-fouling property can be manufactured.

Having generally described this invention, a further understanding can be obtained by reference to certain specific examples which ate provided herein for purposes of illustration only and are not intended to be limiting unless otherwise specified.

EXAMPLE 1

1 ml of $Ti[OCH(CH_3)_2]_4$ completely dissolved in 20 ml of ethanol was slowly added dropwise to 200 ml of a stirred aqueous solution of pH 1.5, thus performing hydrolysis, to yield transparent aqueous solution of $TiO_2$.

The yielded aqueous solution of $TiO_2$ was evaporated using a rotavapor at 35° C., and dried in a vacuum oven at 60 ° C. for 1 hour, to obtain $TiO_2$ particles as white powders, which were then dissolved in water at a predetermined ratio (0.5 g/L) and the pH was adjusted to 2.8, to produce a stable $TiO_2$ dispersed solution.

2 wt % of aqueous MPD (m-phenylenediamine) solution was interfacially polymerized with 0.1 wt % of TMC (trimesoyl chloride) dissolved in an organic solvent, to obtain a polyamide reverse osmosis membrane, which was immersed in said stable $TiO_2$ dispersed solution for 1 hour, thereby preparing a $TiO_2$-incorporated reverse osmosis membrane.

EXAMPLE 2

The same procedure as set forth in Example 1 was carried out, except that $TiO_2$ particles as white powders were dissolved in water at a predetermined ratio (0.5 g/L) and pH was adjusted to 10, to yield a $TiO_2$-incorporated reverse osmosis membrane.

EXAMPLE 3

The same procedure as set forth in Example 1 was carried out, except that LiOH was added in the amount of 0.1 g upon preparation of aqueous solution of $TiO_2$ from hydrolysis of $Ti[OCH(CH_3)_2]_4$, to yield a $TiO_2$-incorporated reverse osmosis membrane.

$TiO_2$ particles synthesized in the above examples 1 to 3 were observed by a transmission electron microscopy and an ultraviolet-visible spectroscopy, whereby the particles were found to be have been synthesized in nano scale with dimensions of 10 nm or smaller.

The reverse osmosis membrane after incorporation with $TiO_2$ synthesized in the above example 1 and the membrane before incorporation with $TiO_2$ were measured for flux and removal of salt. The results are shown in Table 1, below.

TABLE 1

| Sample | Flux (gfd) | Removal of Salt (%) |
|---|---|---|
| Before incorporation with $TiO_2$ | 13.2 | 96.5 |
| After incorporation with $TiO_2$ | 14.4 | 96.6 |

To assay antimicrobial property of the reverse osmosis membrane according to the present invention, each surface of the membrane incorporated with $TiO_2$ prepared in the above example 2 and the non-$TiO_2$ incorporated membrane was cultivated with *Escherichia coli* at a predetermined concentration, under ultraviolet light. Subsequently, the *E.coli* was recovered for a period of time and cultivated on agar plates, and then colonies were counted. Thereby, the survival ratio was determined, by which antimicrobial property of each membrane was assayed. The results are given in Table 2, below. As such, ultraviolet light was irradiated at 365 nm, and cultivation temperature was 37° C.

TABLE 2

| Time (hr) | 0 | 0.5 | 1 | 2 | 3 | 4 |
|---|---|---|---|---|---|---|
| Survival ratio of membrane after incorporation with $TiO_2$ (%) | 100 | 78.9 | 71.3 | 43.6 | 10.9 | 0.0 |
| Survival ratio of membrane before incorporation with $TiO_2$ (%) | 100 | 83.7 | 78.2 | 51.4 | 40.3 | 33.7 |

To assay the fouling effect of the reverse osmosis membrane according to the present invention, the fouling solution comprising *E.coli* of the predetermined concentration was made. Then, the membrane incorporated with $TiO_2$ prepared in the above example 3 and the non-$TiO_2$ incorporated membrane were immersed in the fouling solution for the period of time shown in the following table 3, and thus were artificially subjected to fouling. Each membrane was measured for water permeability, thereby assaying the extent of the fouling. The results are presented in Table 3, below. As such, the cultivation temperature was 30° C.

TABLE 3

| Time (day) | 0 | 0.5 | 1 | 2 | 3 |
|---|---|---|---|---|---|
| Flux of membrane after incorporation with $TiO_2$ (gfd) | 76.2 | 73.1 | 70.4 | 68.7 | 66.1 |
| Flux of membrane before incorporation with $TiO_2$ (gfd) | 77.8 | 72.3 | 63.5 | 60.9 | 58.1 |

As mentioned above, the reverse osmosis membrane incorporated with $TiO_2$ prepared according to the present invention has more excellent antimicrobial effect and decomposition activity against organic contaminants, while maintaining the flux and the removal of salt at the same level, compared with conventional membranes. Therefore, the present membrane can remove microorganisms present in water and prevent the fouling which is generated by such microorganism adsorbed on the membrane.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

We claim:

1. A method of preparing a reverse osmosis membrane having an excellent antifouling property, the method comprising:

hydrolyzing a titanium compound in an aqueous solution under an acidic condition so as to produce $TiO_2$ particles of nano scale;

dispersing the produced $TiO_2$ particles in either an acidic aqueous solution having a pH of 1 to 6 or an alkaline aqueous solution having a pH of 9 to 13 to yield a stable $TiO_2$ dispersed solution; and immersing an aromatic polyamide reverse osmosis membrane in the $TiO_2$ dispersed solution so as to introduce $TiO_2$ into the membrane.

2. The method of claim 1, wherein said $TiO_2$ particles are self-assembled to functional groups present in a thin film layer of said aromatic polyamide reverse osmosis membrane and fixed thereto.

3. The method of claim 1, wherein said titanium compound is selected from the group consisting of $TiCl_4$, $Ti[OCH(CH_3)_2]_4$, $TiOSO_4$ and $TiOCl_2$.

4. The method of claim 1, said step of hydrolyzing comprising:

adding a metal oxide in an amount of 0.01–1.0 weight percent inclusive based on the weight of the aqueous solution.

5. The method of claim 4, wherein said metal oxide is selected from the group consisting of LiOH, $Mg(ClO_4)_2$, $AlCl_3$, $VCl_3$, $VOSO_4.3H_2O$, $VOCl_3$, $Cr(NO_3)_3$, $MnF_3$, $F_2(NO_3)_3.9H_2O$, $CoF_3$, $NiCl_2$, $Zn(ClO_4)_2$, $Ga(NO_3)_3$, $Zr[OCH(CH_3)_2]_4$, $NbCl_5$, $MoCl_5$, $RUCl_3$, $Rh(NO_3)_3.2H_2O$, $SnCl_4$, $SbCl_3$, $TaCl_3$, $ReCl_5$, $OsCl_3$, and $SbCl_5$.

6. The method as set forth in claim 1, wherein said step of hydrolyzing is carried out at a pH of 0.5 to 3.

7. A method for preparing a reverse osmosis membrane having an excellent antifouling property, comprising:

hydrolyzing a titanium compound in an aqueous solution under an acidic condition so as to produce $TiO_2$ particles of nano scale;

separating said $TiO_2$ particles from the aqueous titanic acid solution;

drying the separated $TiO_2$ particles so as to obtain $TiO_2$ as a white powder;

dispersing the $TiO_2$ powder in an acidic aqueous solution of a pH of 1 to 6 or an alkaline aqueous solution of a pH of 9 to 13 so as to yield a stable $TiO_2$ dispersed solution; and immersing a aromatic polyamide in the $TiO_2$ dispersed solution so as to introduce the $TiO_2$ into the membrane.

* * * * *